United States Patent [19]

Wolfe

[11] Patent Number: 5,708,305

[45] Date of Patent: Jan. 13, 1998

[54] OCEAN WAVE ENERGY CONVERSION SYSTEM

[76] Inventor: Douglas E. Wolfe, 9819 Brightlea Dr., Vienna, Va. 22181

[21] Appl. No.: 624,258

[22] Filed: Mar. 29, 1996

[51] Int. Cl.⁶ .................................................. F03B 13/12
[52] U.S. Cl. .............................. 290/53; 290/42; 60/497; 60/501
[58] Field of Search .................... 290/53, 42, 54, 290/43; 60/499, 505, 506, 495; 417/330, 331, 332, 333

[56] References Cited

U.S. PATENT DOCUMENTS

| | | | |
|---|---|---|---|
| 692,396 | 2/1902 | Wilcox | 417/330 |
| 1,097,073 | 5/1914 | Bemis | 417/330 |
| 2,848,189 | 8/1958 | Caloia | 60/505 |
| 3,828,557 | 8/1974 | Mochel | 60/503 |
| 4,514,644 | 4/1985 | Westling | 290/53 |
| 4,560,884 | 12/1985 | Whittecar | 290/42 |
| 4,754,157 | 6/1988 | Windle | 290/53 |
| 4,931,662 | 6/1990 | Burton | 290/42 |
| 5,084,630 | 1/1992 | Azimi | 290/53 |
| 5,094,595 | 3/1992 | Labrador | 417/332 |

FOREIGN PATENT DOCUMENTS 58-91372   5/1983   Japan ........................... 290/53

*Primary Examiner*—Steven L. Stephan
*Assistant Examiner*—Nicholas Ponomarenko
*Attorney, Agent, or Firm*—Joseph H. McGlynn Patent & Trademark Services, Inc.

[57] ABSTRACT

A multi-tiered support structure, with each of the tiers having a horizontally rotating pivoted arm having a float and paddle arrangement on one end and the opposite end is attached to an air compressor. As the waves hit the paddles the pivot arms will operate the compressors to store energy. This energy can then be used to produce electrical or other types of energy.

5 Claims, 2 Drawing Sheets

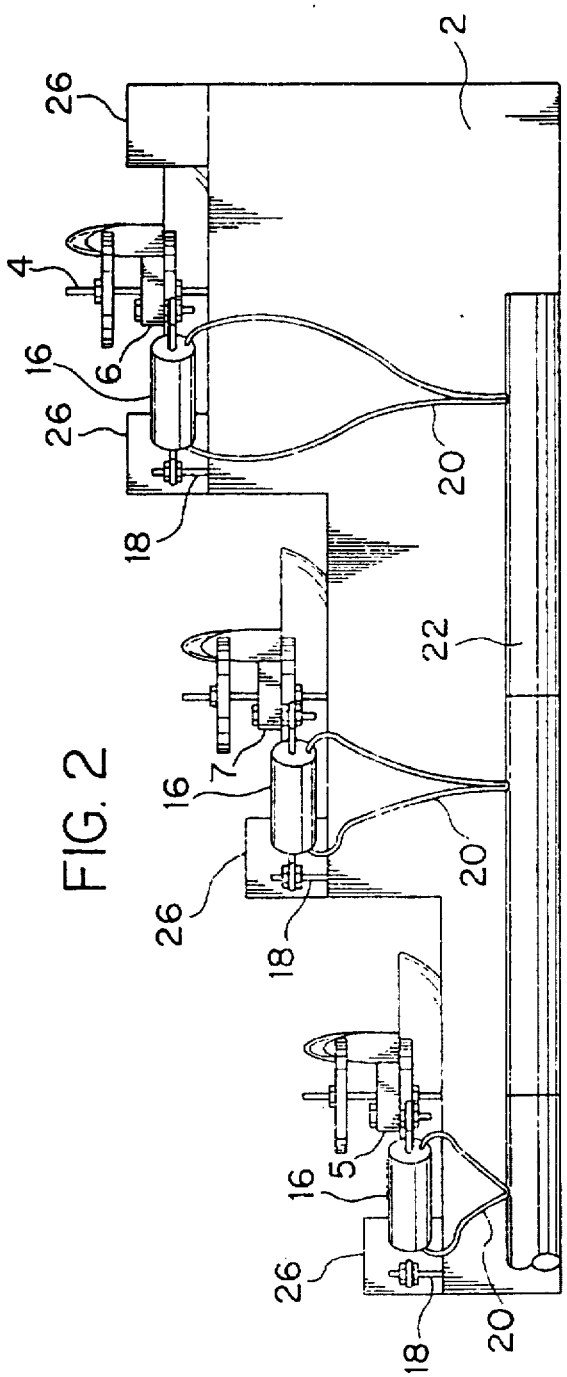
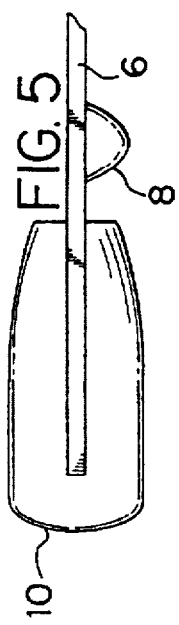
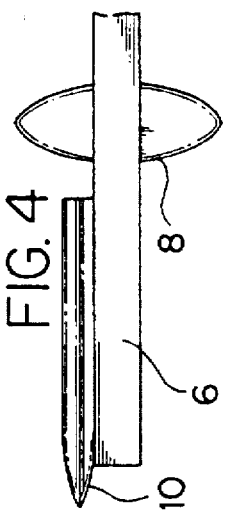
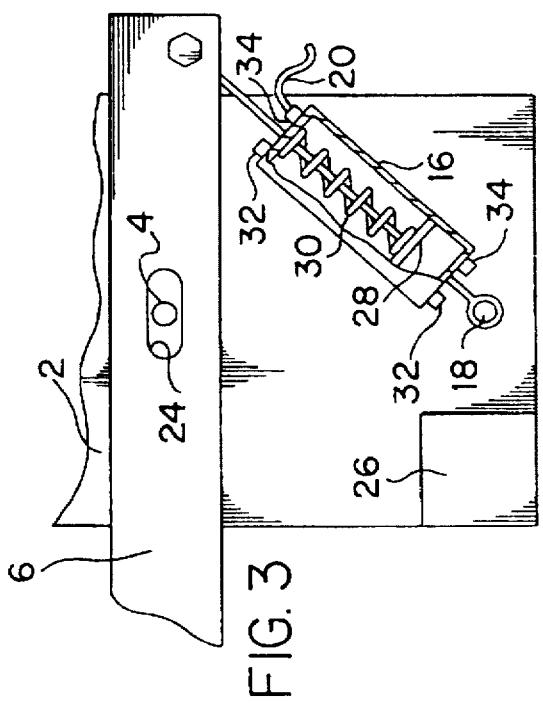

OCEAN WAVE ENERGY CONVERSION SYSTEM

BACKGROUND OF THE INVENTION

This invention relates, in general, to an apparatus for extracting energy, and, in particular, to an apparatus for extracting wave energy from a body of water and storing it to be used at a later time.

DESCRIPTION OF THE PRIOR ART

In the prior art various types of energy extraction devices have been proposed. For example, U.S. Pat. No. 3,828,557 discloses a device which forms electrical power from the pushing action of waves which comprises a boom having a tee head and shutters attached thereto. The shutters intercept the forward motion of the waves and are alternately released to pivot in order to allow the wave to return without hitting the shutters. The booms are attached to a drive shaft which is connected to an electrical generator.

U.S. Pat. No. 4,931,662 discloses a device for converting ocean wave energy to electricity which consists of a rigid beam with a circular float on one end, and the other end is connected to hydraulic or fluid pumps. The motion of the waves on the float produces hydraulic or fluids under pressure which drives an electrical generator.

U.S. Pat. No. 4,514,644 discloses a pumping unit which is driven by wave energy. A horizontal boom with two forward sections disposed at right angles to each other with blades attached thereto are mounted on one end of the boom. As one blade is moved toward shore by a wave it moves the boom in one direction about a vertical axis, causing the other blade to be moved out over the water. Then the first blade can be lifted out of the water and the second blade dropped into the water to be acted upon by a wave. The boom is connected to a pump which eventually drives an electrical generator.

U.S. Pat. No. 4,754,157 discloses an apparatus for obtaining energy from wave action which consists of a cylinder and a reciprocal piston in the cylinder. A rod extends out of the cylinder and is connected to a float. As a wave acts on the float, it transfers the motion to the rod which is used to operate a hydroelectric generator.

As evidenced by the above cited patents, many attempts have been made to develop a mechanism to capture the renewable energy of ocean waves. While wave energy conversion concepts have the common advantage of using a clean and safe renewable energy source, the efficiency and cost of developed concepts have not allowed them to be competitive with other forms of energy producers. The present invention resolves the problematic issues in other concepts and represents a significant advancement beyond the existing state-of-the-art devices In general, known devices suffer from similar problematic issues. They capture wave energy only at one point over the wave travel, known as a point absorber. They do not effectively use force multiplication. They ignore the existence of ocean currents and their energy conversion potential. In addition, they don't adjust effectively to the rise and fall of the ocean tides. These factors combine to render existing devices inefficient in capturing and converting wave energy.

Specifically as applied to the prior art, U.S. Pat. Nos. 3,828,557 and 4,754,157 are examples of point absorbers of wave energy. This type of device is hampered by the fact that it is limited to a single location and the efficiency will vary as the tide shifts and the corresponding peak force of the wave. This results in a force which is not constant and which possesses no leverage. It also means there is a significant period of time before the next wave impacts the point absorber.

U.S. Pat. No. 4,931,662 is another type of point absorber that relies on a float that travels in a direction perpendicular to the ocean. The wave height may travel only a few feet from the trough to the crest and, therefore, the amount of wave energy that will be captured will be severely restricted. Also, there is no mechanism to allow for a tide shift, which will result in an uneven output of energy.

U.S. Pat. No. 4,514,644 wastes a significant amount of wave energy moving the boom and, therefore, the amount of actual energy produced will be small. Also, tidal shift has been ignored, as in the other patents.

Therefore, what is needed is a system for capturing the energy of ocean waves which is cost effective with the other forms of energy producers and must necessarily eliminate the problematic issues raised by the prior art

SUMMARY OF THE INVENTION

The present invention consists of a multi-tiered support structure, with each of the tiers having a pivoted arm having a float and paddle arrangement on one end and the opposite end is attached to an air compressor. As the waves hit the paddles the pivot arms will operate the compressors to store energy. This energy can then be used to produce electrical or other types of energy.

It is an object of the present invention to provide an ocean wave energy conversion system capable of continuously absorbing energy over the entire travel of the wave.

It is an object of the present invention to provide an ocean wave energy conversion system which incorporates a force multiplier.

It is an object of the present invention to provide an ocean wave energy conversion system which captures current energy in addition to wave energy.

It is an object of the present invention to provide an ocean wave energy conversion system which adjusts for the fall and rise of tides.

It is an object of the present invention to provide an ocean wave energy conversion system which has no moving parts in the water and, therefore, can be easily protected from the corrosive salt water environment.

It is an object of the present invention to provide an ocean wave energy conversion system which is competitive with fossil fuels and is useful throughout the year in a large number of coastal areas.

It is an object of the present invention to provide an ocean wave energy conversion system which has a low initial investment cost, is easily expandable to meet rising energy demand and requires minimal maintenance.

These and other objects and advantages of the present invention will be fully apparent from the following description, when taken in connection with the annexed drawings.

BRIEF DESCRIPTION OF THE DRAWINGS

FIG. 2 is a side view of the present invention.

FIG. 3 is a top view of one of the platform levels present invention showing the structural arm and the inner workings of the compression piston.

FIG. 4 is a top view showing the float and paddle attached to the arm.

FIG. 5 is a side view showing the float and paddle attached to the arm.

DESCRIPTION OF THE PREFERRED EMBODIMENT

Figure 1:
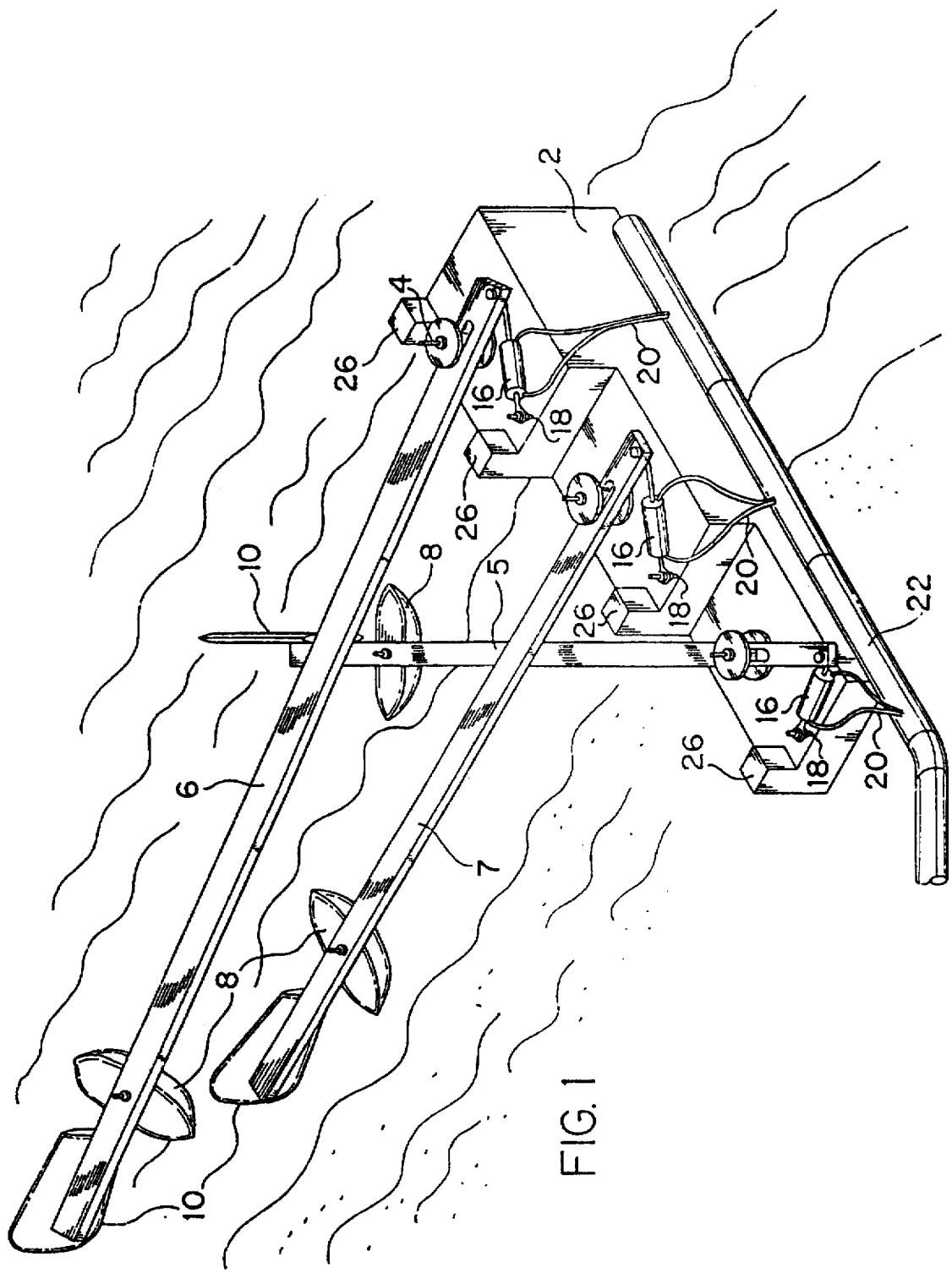
FIG. 1 is a perspective view of the present invention.

Referring now to the drawings in greater detail, FIG. 1 shows the wave energy conversion system of the present invention which consists of a multi-tiered support structure 2. Although three tiers are shown in FIG. 1, it should be understood that this is merely for illustration purposes, and more or less tiers could be added as necessary. Attached to each level of tiers is a pivot pin assembly 4, about which each of the arms 5, 6, and 7 rotate. Each of the arms extend horizontally from their respective tiers and are of different lengths to prevent one arm from interfering with an adjacent arm as the arms are moved by the action of the waves.

At the free end of each arm is attached a float structure 8 which will help to support the arms within the water, and also a paddle 10 is attached to the ends of the respective arms which will be acted upon by the waves, and will therefore capture the wave energy, schematically shown by the arrow 12, and the energy of the current, schematically shown by the arrow 14.

The arms 5, 6, and 7 are oriented such that the prevailing current energy 14 and wave energy 12 will force the arms toward the shore. Each arm is attached to its respective pivot pin 4 by means of a slot 24 (see FIG. 3) in the arm which allows for movement of the arms toward and away from the tiers, as well as up and down as the floats 8 raise and lower the arms due to the tidal elevation. The arms are held on the pins 4 by a retaining plate which is attached to the pins in any conventional manner.

The ends of the arms 5, 6, and 7 which are closest to the pins 4 have a pin which attaches the arms to one end of a dual action compression piston 16. The other end of the piston is affixed to the tiers by an anchor bolt 18 of any conventional design. As the arms 5, 6, and 7 rotate about the pivot pins 4, the compression piston 16 forces air through the air hose 20, into the transportation tube 22, and eventually into a storage tank (not shown).

On each level of the multi-tiered structure 2 is mounted a restraining block 26 (see FIGS. 1 and 2). The restraining blocks 26 which limit the amount the arms will rotate under the force of the waves and the current. Also, while the restraining blocks are shown as being unitary with the tiers 2, it should be understood that the blocks can be made as separate elements that are attached to the tiers by any conventional means.

As shown in FIG. 3, within each piston 16 is a piston face 28 to compress air within the cylinder, and a compression spring 30 of conventional structure. Each piston also has two air inlet valves 32 and two compressed air outlet valves 34 attached to the air hoses 20. Each inlet and outlet valve contains a one way check valve of conventional design such that fluid will flow only in the specified inlet or outlet direction. The size of the compression piston 16, piston face 28 and compression spring 30 will vary depending upon the average local wave energy 12, current energy 14, and the length of the arms 5, 6, and 7.

In use, the force of waves and/or current will act upon the floats 8 and the paddles 10 which will cause the arms 5, 6, and 7 to rotate about the pivot pins 4. The connection between the arms and the piston 16 will compress air within the piston which will then be transferred through tubes 20 and 22 to a storage tank (not shown). Air may then be extracted from the storage tank and used in any conventional manner, such as by driving a generator to produce electricity.

The wave absorbing paddles 10 will catch the force of the waves and current which in turn will drive the arms 5, 6, and 7 toward the shore. Each of the arms will pivot about pins 4, thereby moving the piston to compress air within the cylinder. As the arms move toward the shore, the spring 30 will be compressed as the piston face 28 is moved toward the bottom of the cylinder, thereby compressing air. As the piston face 28 moves toward the bottom of the cylinder 16, air will be forced through outlet 34 and into a storage tank. At the same time the conventional one way check valve (not shown) in inlet tube 32, will close, thereby preventing any air from escaping through this tube.

The arms move toward the shore until they strike the restraining blocks 26. The support structure and the restraining blocks should be positioned so that the floats 8 will not strike the ground at low tide. As the arms are forced against the restraining blocks, they will deflect slightly as the wave continues to move toward the shore.

As the wave moves past the paddle 10, the arms will be forced away from the shore by the spring energy in the deflected arms, the expansion of the compression spring 30, and the undertow or backwash of the wave. All of these forces acting together will force the arms back into position to receive the next wave. During this return stroke, air will be compressed by the dual action compression piston 16. As the piston face 28 moves toward the top of the cylinder, air will be forced through outlet 34 and tube 20 and into a storage tank. At the same time the conventional one way check valve (not shown) in inlet tube 32, at the top of the cylinder 16, will close, thereby preventing any air from escaping through this tube. As the one way check valve in inlet tube 32, at the top of the cylinder 16, closes, the one way check valve in inlet tube 32, at the bottom of the cylinder 16, opens, thereby allowing air to be introduced into the bottom of the cylinder. If air were not introduced into the bottom of the cylinder, as the piston moves up, a vacuum would be created which would interfere with normal operation of the cylinder. In a similar manner, air must be introduced into the top of the cylinder 16 through the conventional one way check valve in air inlet 32 at the top of the cylinder, when the piston face 28 is moving toward the bottom of the cylinder.

In this manner, energy is efficiently captured in a continuous fashion during the inbound and outbound rotation of the arms 5, 6, and 7. By using the force multiplying arms 5, 6, and 7 in a horizontal direction, the large range of motion of the float 8 and paddle 10 allow a significant stroke of the dual action compression piston 16 and a large volume of air can be compressed during each wave cycle.

Since the arms 5, 6, and 7 work independently of each other, the system will work even if one or more of the arms are inoperative. Also, because of the different heights of the tiers and the vertical adjustment allowed by the slot 24, the arms will continue to work even at low tide.

Although the ocean wave energy conversion system and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention. For example, other energy storage mechanisms could be employed including, but not limited to mechanical kinetic energy systems and other pressurized fluid systems. Also, different designs of the floats and paddles can be used and they can be mounted at different locations on the arms to maximize wave and current energy in different locations.

What I claim as my invention is:

1. A wave energy conversion system for capturing the energy of ocean waves comprising:

a support platform having a base and tiers spaced at different heights above said base, each tier having means for rotatably supporting a horizontal arm at one end of said arm, said arms being of different lengths, another end of said arm significantly extended from said support platform, and having float means attached adjacent thereto, said another end of said arm also having means for receiving the force of ocean waves and current for transferring said force to said arms, said one end of said arms being attached to a compression means for compressing fluids, and having means for transferring said compressed fluids to a storage facility.

2. The wave energy conversion system as claimed in claim 1, wherein said tiers have restraining means mounted thereon for limiting movement of said arms in one direction.

3. The wave energy conversion system as claimed in claim 1, wherein said compression means is a dual action compression piston.

4. A method of capturing wave energy utilizing the wave energy conversion system as claimed in claim 1, wherein said method comprises:

establishing a support structure adjacent an ocean, providing different platforms at different heights on said support structure, attaching a horizontal rotating arm to a pivot point on each of said platforms, attaching a flotation means adjacent a distal end of each arm, attaching a means for capturing wave and current energy to said distal end of each arm, providing a fluid compression means adjacent said pivot point, connecting said fluid compression means to said arms, connecting said fluid compression means to a storage means.

5. A wave energy conversion system as claimed in claim 1, wherein said arms have a length and a width, and said arms rotate in a horizontal plane which is substantially coextensive with said length.

* * * * *